(12) United States Patent
Jenkins et al.

(10) Patent No.: US 8,949,165 B2
(45) Date of Patent: Feb. 3, 2015

(54) PROCEDURE, APPARATUS, SYSTEM, AND COMPUTER PROGRAM FOR NETWORK PLANNING

(75) Inventors: David W. Jenkins, North Aurora, IL (US); Thomas T. Rarick, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1234 days.

(21) Appl. No.: 12/641,012

(22) Filed: Dec. 17, 2009

(65) Prior Publication Data

US 2011/0150470 A1 Jun. 23, 2011

(51) Int. Cl.
*H04B 10/20* (2006.01)
*H04Q 3/00* (2006.01)

(52) U.S. Cl.
CPC ................................. *H04Q 3/0083* (2013.01)
USPC .......................................................... 706/47

(58) Field of Classification Search
None
See application file for complete search history.

(56) References Cited

U.S. PATENT DOCUMENTS

| | | | |
|---|---|---|---|
| 7,818,389 B1 * | 10/2010 | Chiang et al. ................. | 709/212 |
| 2006/0100912 A1 * | 5/2006 | Kumar et al. ...................... | 705/4 |
| 2006/0112033 A1 * | 5/2006 | Vion et al. ....................... | 706/16 |
| 2006/0159020 A1 * | 7/2006 | Porat .............................. | 370/235 |
| 2008/0008474 A1 | 1/2008 | Boduch et al. | |
| 2008/0013953 A1 | 1/2008 | Boduch et al. | |
| 2008/0013954 A1 | 1/2008 | Boduch et al. | |
| 2008/0260386 A1 | 10/2008 | Boduch et al. | |
| 2009/0228228 A1 | 9/2009 | Badger et al. | |
| 2010/0129078 A1 * | 5/2010 | Weston-Dawkes et al. .... | 398/79 |

\* cited by examiner

*Primary Examiner* — Kakali Chaki
*Assistant Examiner* — Michael Zidanic
(74) *Attorney, Agent, or Firm* — Fitzpatrick, Cella, Harper & Scinto

(57) ABSTRACT

A method, apparatus, system, and computer program, for operating a network planning tool. The method includes recognizing at least one predetermined criteria being satisfied or triggered, and learning at least one network attribute, to be used in subsequent network planning. Various types of network attributes can be learned, such as, e.g., network element parameters, site parameters, link parameters, demand parameters, optical parameters, general parameters, and networking parameters. Example attributes may specify, e.g., a maximum number of add/drop channels, at least one alarm threshold, a maximum number of sites per network ring, a maximum number of add/drop sites per ring, and a maximum ring circumference. Others can specify a maximum light path distance, a routing tendency, at least one grooming node, or the like.

20 Claims, 13 Drawing Sheets

| Network Element Parameters | Example value | Remark | |
|---|---|---|---|
| Discount % | 0 | Price discount | 340 |
| Spare % | 0 | percent of transponders to allocate as spares | 340 |
| Management System | No | include a software management system? | 340 |
| Craft Station Software Required | Yes | Basic software required | 340 |
| Use AIP for each bay | No | Add Alarm Interface Panel per bay | 340 |
| Place SPFAB and supporting Transponder Modules on a new Port Shelf? | No | Place SONET/Packet FABric to allow intercards transport | 340 |
| SPFAB SONET/SDH Capacity Warning Message Threshold | 70 | % of total SONET/SDH capacity | 340 |
| SPFAB SONET/SDH Capacity Error Message Threshold | 100 | % of total SONET/SDH capacity | 340 |
| SPFAB Packet Capacity Warning Message Threshold | 50 | % of total packet capacity | 340 |
| SPFAB Packet Capacity Error Message Threshold | 80 | % of total packet capacity | 340 |
| Max Alien Profiles (From all vendors) | 0 | Number of external vendor wavelengths allowed | 340 |
| Used Paired Slots for Alien Wavelength Interface Modules | Yes | Use slots that allow intercard communication for external vendor cards | 340 |
| Used Dedicated Shelf for Alien Wavelength Interface Modules | Yes | Use a dedicated shelf for external vendor cards | 340 |
| Use SMALL_NE? | Yes | Use small version of network element | 340 |
| Max SMALL_NE Add/Drop Channels | 8 | Maximum channel capacity for SMALL_NE | 340 |
| Max SMALL_NE shelves per NE | 4 | Maximum number of shelves including Main and Port shelves | 340 |
| SMALL_NE shelves position | Horizontal | Used only if Templates/SMALL_NE Default is not set | 340 |
| Filler Module for LARGE_NE Port Shelves | | specify module to use if slot is not used (filler, usually) | 340 |
| Filler Module for LARGE_NE Main Shelves | | specify module to use if slot is not used (filler, usually) | 340 |
| Filler Module for SMALL_NE Slots 1-6 | | specify module to use if slot is not used (filler, usually) | 340 |
| Filler Module for SMALL_NE Controller Slots | | specify module to use if slot is not used (filler, usually) | 340 |
| Add Port Shelf to Single Main Shelf Bays | No | Add additional shelf for port cards even if it not required SONET Multiplexing Transport Module has some configuration rules | 340 |
| Enable SMTM-U Configuration Constraint Rules | No | Confirm cards are compatible with shelves | 340 |
| Validate RCMM 81.xxxx 82.xxxx using site HwFPs | Yes | | 340 |
| Use FOADM4? | Yes | Use Fixed Optical Add/Drop Multiplexer configured for 4 wavelengths | 340 |
| Use FOADM44? | Yes | Use Fixed Optical Add/Drop Multiplexer configured for 44 wavelengths | 340 |
| Use Control Plan Software | No | Use special automated routing software? | 340 |
| Filler Module for DCM Shelves | DCM Blank | specify module to use if slot is not used (filler, usually) | 340 |
| Use LIAM-E88/LRAM-E88/ELRAM-E88 as default for FOADM4 sites? | Yes | Use amplified Fixed Optical Add/Drop Multiplexer configured for 4 wavelengths | 340 |
| Use LIAM-E88/LRAM-E88/ELRAM-E88 as default for FOADM44 sites? | Yes | Use amplified Fixed Optical Add/Drop Multiplexer configured for 44 wavelengths | 340 |
| Use LIAM-E88/LRAM-E88/ELRAM-E88 as default for NanoOLA sites? | No | Use amplified SMALL_NE sites | 340 |
| Use Redundant Processor Cards (DPM/SPM/SPM-N)? | Yes | | 340 | fig 3

FIG. 4A-1

| Network Element Parameters | Example value | Remark | |
|---|---|---|---|
| Discount % | 0 | Price discount | 340 |
| Spare % | 0 | percent of transponders to allocate as spares | 340 |
| Management System | No | include a software management system? | 340 |
| Craft Station Software Required | Yes | Basic software required | 340 |
| Use AIP for each bay | No | Add Alarm Interface Panel per bay | 340 |
| Place SPFAB and supporting Transponder Modules on a new Port Shelf? | No | Place SONET/Packet FABric to allow intercards transport | 340 |
| SPFAB SONET/SDH Capacity Warning Message Threshold | 70 | % of total SONET/SDH capacity | 340 |
| SPFAB SONET/SDH Capacity Error Message Threshold | 100 | % of total SONET/SDH capacity | 340 |
| SPFAB Packet Capacity Warning Message Threshold | 50 | % of total packet capacity | 340 |
| SPFAB Packet Capacity Error Message Threshold | 80 | % of total packet capacity | 340 |
| Max Alien Profiles (From all vendors) | 0 | Number of external vendor wavelengths allowed | 340 |
| Used Paired Slots for Alien Wavelength Interface Modules | Yes | Use slots that allow intercard communication for external vendor cards | 340 |
| Used Dedicated Shelf for Alien Wavelength Interface Modules | Yes | Use a dedicated shelf for external vendor cards | 340 |
| Use SMALL_NE? | Yes | Use small version of network element | 340 |
| Max SMALL_NE Add/Drop Channels | 8 | Maximum channel capacity for SMALL_NE | 340 |
| Max SMALL_NE shelves per NE | 4 | Maximum number of shelves including Main and Port shelves | 340 |
| SMALL_NE shelves position | Horizontal | Used only if Templates/SMALL_NE Default is not set | 340 |
| Filler Module for LARGE_NE Port Shelves | | specify module to use if slot is not used (filler, usually) | 340 |
| Filler Module for LARGE_NE Main Shelves | | specify module to use if slot is not used (filler, usually) | 340 |
| Filler Module for SMALL_NE Slots 1–6 | | specify module to use if slot is not used (filler, usually) | 340 |
| Filler Module for SMALL_NE Controller Slots | | specify module to use if slot is not used (filler, usually) | 340 |
| Add Port Shelf to Single Main Shelf Boys | No | Add additional shelf for port cards even if it not required SONET Multiplexing Transport Module has some | 340 |
| Enable SONET_MUX-U Configuration Constraint Rules | No | configuration rules | 340 |
| Validate cards using site Hardware Feature Packages | Yes | Confirm cards are compatible with shelves | 340 |
| Use FOADM4? | Yes | Use Fixed Optical Add/Drop Multiplexer configured for 4 wavelengths | 340 |
| Use FOADM44? | Yes | Use Fixed Optical Add/Drop Multiplexer configured for 44 wavelengths | 340 |
| Use Control Plan Software | No | Use special automated routing software? | 340 |
| Filler Module for DCM Shelves | DCM Blank | specify module to use if slot is not used (filler, usually) | 340 |
| _AMP88/MEDIUM_AMP88/LARGE_AMP88 as default for FOADM4 sites? | Yes | Use amplified Fixed Optical Add/Drop Multiplexer configured for 4 wavelengths | 340 |
| _AMP88/MEDIUM_AMP88/LARGE_AMP88 as default for FOADM44 sites? | Yes | Use amplified Fixed Optical Add/Drop Multiplexer configured for 44 wavelengths | 340 |
| _AMP88/MEDIUM_AMP88/LARGE_AMP88 as default for SMALL_OLA sites? | No | Use amplified Small Optical Line Amplifier sites | 340 |
| MODULE//PROCESSOR_MODULE/PROCESSOR_MODULE-SMALL_NE? | Yes | use redundant processor modules | 340 | fig 3

FIG. 4A-2

| Site Parameter | Example value | Remark | Figure 3 |
|---|---|---|---|
| Default Site FP | FP6.0 | Feature release | |
| Default LGX db Loss | 0.50 | Loss due to optical patch panels | 300 |
| Default RCMM | Auto | Type of Receive and Continue Multiplexer Modual (optical switch) | 300 |
| Allow Port Module on Main Shelf? | No | Allow Transponder cards on main shelf | 300 |
| Shelfs per Rack | 2 | | 300 |
| Alarm Interface Panel per Rack | No | | 300 |
| Use Same Bay for Both Main Shelfs When Required | Yes | | 300 |
| Statistical Multiplexing Gain(SMG) | 1.00 | | 300 |
| Allocate Spares to All Sites | No | | 300 |
| Regenerate all channels for FOADM4 | No | | 300 |
| Regenerate all channels for FOADM44 | Yes | Add transponders for Fixed Optical Add Drop Multiplexer | 300 |
| Max Number of RNEs allowed for an EON Group | 30 | | 300 |
| Automatic Inventory Control (for filler cards) | No | When GbE default module is SMTM-P | 300 |

| Link Parameter | Example value | Remark | |
|---|---|---|---|
| Unit of Distance | KM | | 300 |
| Default Fiber Type | SMF-28 | choose among many fiber types | 300 |
| Fiber Aging/Loss Margin (In %) | 0 | specify additional loss due to aging of glass fiber | 300 |
| Enter CD/Slope Using Columns | CDch1 and CDch44/88 | method to specify chromatic dispersion of fiber | 300 |
| Enable Direct Fiber Bundle | No | allow single wavelength fiber pairs | 300 |

| Demand Parameter | Example value | Remark | |
|---|---|---|---|
| Point-to-point demand type | GbE | default demand type | 320 |
| Number of STS1s for GbE | 21 | bandwidth used to pack Internet Protocol traffic | 320 |
| Default Module for GbE (N/A for FP2.x sites) | SMTM-U[82] | default module use to pack Internet Protocol traffic | 320 |
| Show Hub Parameters? | No | show routing parameters in demand reporting | 320 |
| Preference for Mesh Protection Paths | Node Disjoint | | 320 |

Optical Parameter

| Parameter | Example value | Remark | |
|---|---|---|---|
| Max Channels % to Use | 100.0 | | 310 |
| Max Numbers of Channels Supported | 88 | | 310 |
| Forward Error Checking | EFEC | | 310 |
| Default regen module for 10G | TGTM-E | Ten Gigabit Multiplexer Module chosen for Optical Regeneration | 310 |
| Default Regen module for 2.5G | MRTM-E | Multi-Rate Multiplexer Module chosen for Optical Regeneration | 310 |
| Default Regen module for 40G-DPSK | FGTM-M-DPSK | Forty Gigabit Multiplexer Module (Muxing) chosen for Optical Regeneration for Differential Phase Shift Keying | 310 |
| Default Regen module for 40G-DQPSK | FGTM-M-DQPSK | Forty Gigabit Multiplexer Module (Muxing) chosen for Optical Regeneration for Differential Quadrature Keying Shift Keying | 310 |

General Parameter

| Parameter | Example value | Remark | |
|---|---|---|---|
| Max number of sites per ring | 64 | | 330 |
| Max add/drop sites per ring | 64 | | 330 |
| Max ring circumference(KM) | 0 | 0=No Limit | 330 |
| AnyAny design for | 40G-DPSK | Compute all CD values for all paths in each ring for the given traffic rate | 330 |
| Allow add drop at user OLA sites | Yes | | 330 |
| Allow add drop at proposed OLA sites | Yes | | 330 |
| Max light path distance (in KM) | 1150000 | | 330 |
| Compute AnyAny OSNR | Yes | Before regens are required Compute all OSNR margin values for all paths in each ring for the given traffic rate | 330 |
| Concentrate rings when needed | Yes | | 330 |
| Demand View Periods | 2 | | 330 |
| Design With Look Ahead | No | Depends on Start Period and "Total Number of Periods" | 330 |
| Global Planning Mode | SONET | Consider future demands | 330 |
| OLA Upgrades to fix Any-To-Any OSNR errors | Auto | Global for all scenarios | 330 |
| Place RAMAN/MEDIUM_AMP initially | No | Upgrade Amplifiers to reduce noise in the network Use Raman Amplifiers with mid range amps in place of long range amps | 330 |
| Place RAMAN/SMALL_AMP initially | No | Use Raman Amplifiers with short range amps in place of mid range amps | 330 |
| DCM Placement | Span-Based | Method to place disperion compensating modules | 330 |
| Total Number of Periods | 20 | total number of time periods to model | 330 |
| Start Period | 1 | | 330 |
| Route around ring side with fewer Regens preferentially | Yes | choose to route unprotected demands the short path around a ring | 330 |

Networking Parameters

| Parameter | Example value | Remark | |
|---|---|---|---|
| Preferred regen sites | QWERTL-NP | Sites where optical regeneration via transponder cards is preffered | 330 |
| Preferred ROADM site for tilt correction | QADM-88 | Type of Equipment used to balance optical power levels | 310 |
| Preferred Amplifier cutoff (Short-Medium amp) | 14 dB | demarcation between amplifiers | 310 |
| Preferred Amplifier cutoff (Medium-Long amp) | 22 dB | demarcation between amplifiers | 310 |
| Preferred routing scheme between endpoints | varies between endpoints | Selection of routes between specific sites | 330 |
| Preferred bitrate | Highest | standardize on backbone technology | 330 |
| Preferred Protection Scheme | 3 path mesh | Standardize on means to protect traffic | 330 |
| Preferred optimization scheme | Bandwidth-Km | Metric used for optimization | 330 |

PROCEDURE, APPARATUS, SYSTEM, AND COMPUTER PROGRAM FOR NETWORK PLANNING

BACKGROUND

1. Field

Example embodiments herein relate to a network planning tool, and, in particular, to a network planning tool that automatically learns network attributes for use in network planning.

2. Description of Related Art

Communication networks, including some optical mesh networks, transport live traffic over "working" communication paths, and also include protect paths that act to back-up, or otherwise carry traffic re-routed from, the working paths. Path sharing among different working demands can be provided. Preferably, many protect paths are available, as limited by the equipment implemented in the network. Protect paths can be shared or dedicated in combination for multiple paths.

Mesh network demands may be entirely at an optical level, or can be at sub-rate levels (i.e., portions of the optical signal). Optimal routing of the paths can depend on the network topology, surrounding physical structures (e.g., buildings) accommodating the paths, and other factors (e.g., business factors or otherwise).

Optimization of all these factors generally is attempted by individual network planners, in a very time-consuming procedure that involves the planner updating network attributes in a computerized network planning tool used to design network topologies and plan future growth.

Mesh networks can share protect paths between multiple (e.g., 4 to 5) demands, and can use resources efficiently. These types of networks are less expensive than ring networks, but often are not as survivable. In countries like India, for example, mesh networks are more prevalent than ring networks (which are more prevalent in the U.S.), and these mesh networks can be susceptible to many fiber cuts. The use of more than a single protect path can increase survivability of those networks, and can be effected in a wavelength or sub-wavelength level.

Of course, maximizing protection while minimizing equipment in order to reduce costs, often can be a challenge to the network designer, who may need to periodically evaluate and manually alter network planning tool attributes in order to meet demand requirements and growth.

SUMMARY

The foregoing and other limitations are overcome by a network planning learning procedure, system, apparatus, and computer program. The method includes recognizing at least one predetermined criteria being satisfied or triggered, and learning at least one network attribute, to be used in subsequent network planning. Various types of network attributes can be learned, such as, e.g., attributes specifying a regeneration site, maximum number of add/drop channels, at least one alarm threshold, a maximum number of sites per network ring, a maximum number of add/drop sites per ring, and a maximum ring circumference. Others can specify a maximum light path distance, a routing tendency, at least one grooming node, or the like. In one example embodiment, categories of network attributes that can be learned include at least one or more of network element parameters, site parameters, link parameters, demand parameters, optical parameters, general parameters, and networking parameters.

In one example embodiment, the at least one predetermined criteria includes at least one of the elapse of a predetermined amount of time, the occurrence of a predetermined number of predetermined events, the at least one network attribute being specified a predetermined number of times, and a recognition that the at least one network attribute has a greatest frequency among network attributes.

BRIEF DESCRIPTION OF THE DRAWINGS

FIG. 4 includes FIG. 4A (which includes FIGS. 4A-1 to 4A-2) to 4D, wherein FIGS. 4A, 4B, and 4C represent examples of network parameters that can be employed in a network planning tool according to an example embodiment described herein.

Identical portions of the various figures have been identified with the same reference numerals in order to simplify the description herein. Same components have been designated using the same reference numerals.

DETAILED DESCRIPTION

According to a example aspect herein, a network planning learning procedure, system, apparatus, and computer program are provided, that make network planning more efficient.

An example embodiment of a network planning implementation will be described with respect to FIGS. 1 to 4. The network in this example embodiment is a mesh network in which one or more nodes have multiple degrees, i.e., they have communication links with more than two other nodes so that upon receiving incoming data on one link, there is more than one choice of link for outputting or forwarding the data. While this example is described in the context of planning a mesh network, those skilled in the art will appreciate that this is merely one example embodiment usable with aspects described herein, which aspects are not limited for use with only mesh networks or any other type of network configuration. Planning for other types of networks (e.g., rings or otherwise) also is within the scope of this invention.

Figure 1:
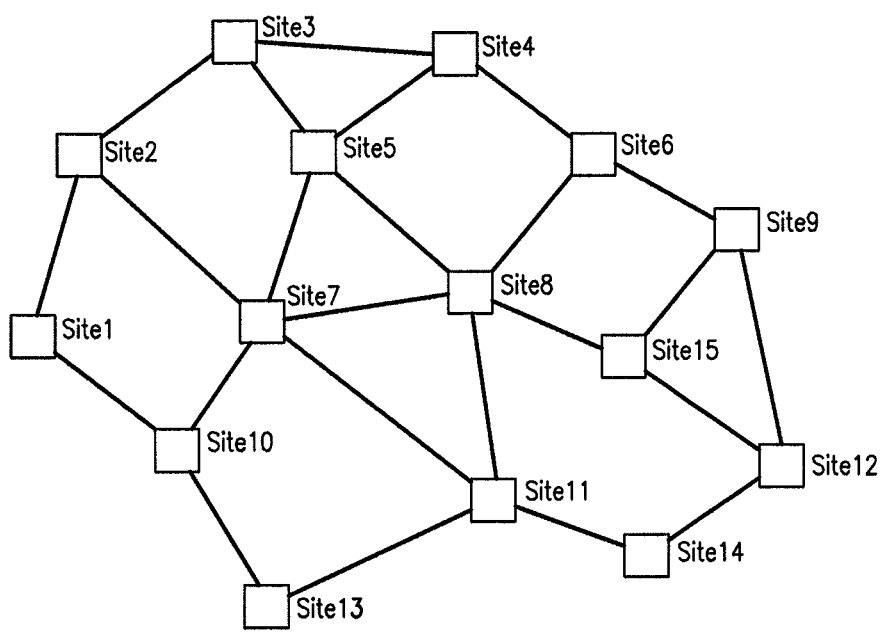
FIG. 1 is a representation of an example communication network, wherein the representation may be a graphical display that represents the communication network.

As shown in FIG. 1, there are links extending between nodes, represented by designations Site1 to Site 14. Each link represents at least one communication path, or span, wherein each span includes, for example, at least one pair of optical fibers, and each Site1 to Site14 represents, for example, one or more of an optical line terminal (OLT), a reconfigurable optical add-drop multiplexer (ROADM), an Optical Network Terminal (ONT), an Optical Network Unit (ONU), a Remote Terminal (RT), an Optical Line Terminal (OLT), an Optical Distribution Network (ODN), and/or any other type of communication node, that can communicate, for example, voice, data, and/or video. ROADMs can be any existing or later developed type of ROADM, including, for example, those described in U.S. patent application Ser. No. 11/697,527, filed Apr. 6, 2007; Ser. No. 11/697,513, filed Apr. 6, 2007; Ser. No. 12/099,587, filed Apr. 8, 2008; Ser. No. 11/776,994, filed Jul. 12, 2007; and Ser. No. 12/044,322 filed Mar. 7, 2008. It should be noted, however, that the present invention, broadly construed, is not limited for use with any one particular type of communication node, network, or communication path.

Each span carries, for example, a plurality (e.g., 32 or 44) of wavelengths or sub-wavelengths. In one example embodiment, WDM and/or DWDM is implemented on at least some spans and in one or more of Site1 to Site14 of the network.

Figure 2:
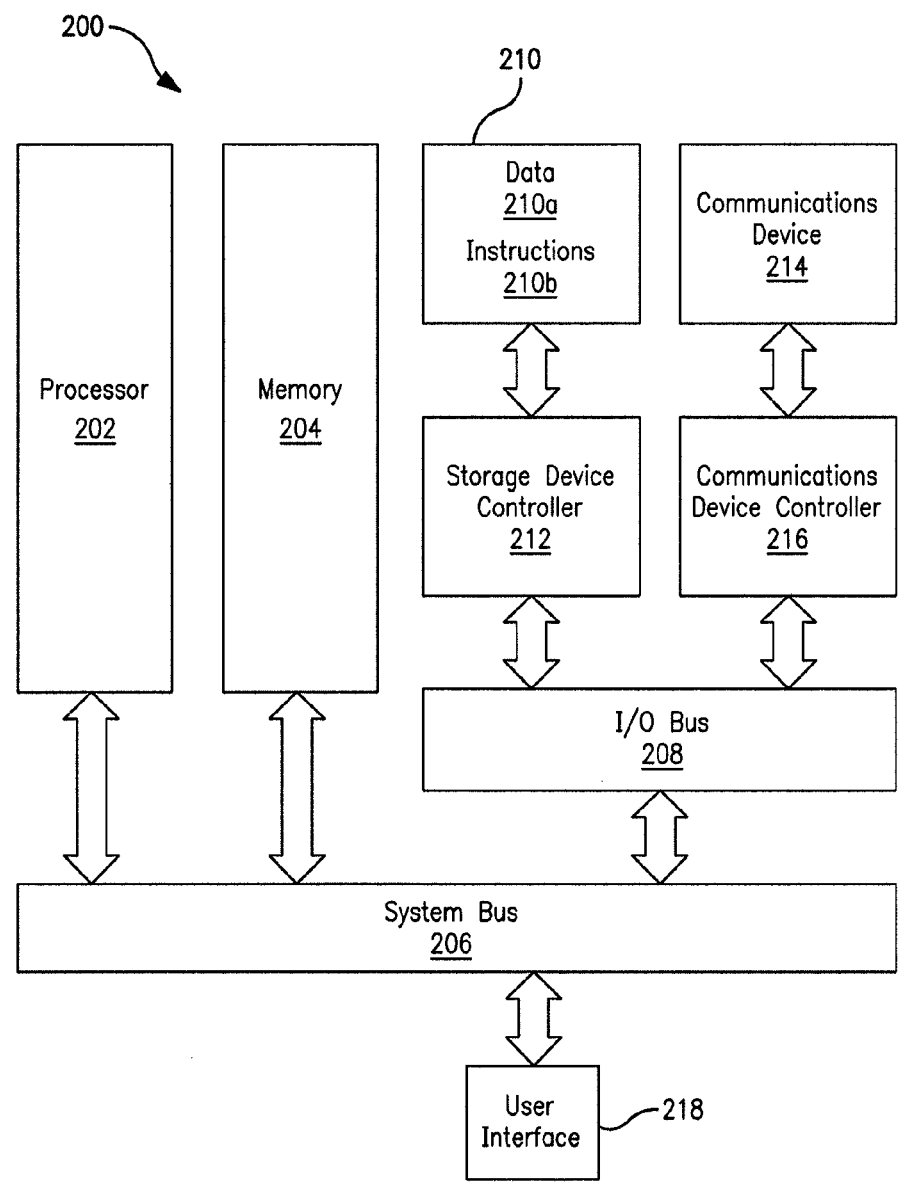
FIG. 2 is an architecture diagram of a processing system in accordance with an example embodiment described herein.

Reference is now made to FIG. 2, which is an architecture diagram of an example data processing system 200, which in one example embodiment, can further represent a network planning tool device and/or an individual network node (Site1 to Site14). Data processing system 200 includes a processor 202 coupled to a memory 204 via system bus 206. Processor 202 is also coupled to external Input/Output (I/O) devices (not shown) via the system bus 206 and an I/O bus 208, and at least one input/output user interface 218. Processor 202 may be further coupled to a communications device 214 via a communications device controller 216 coupled to the I/O bus 208. Processor 202 uses the communications device 214 to communicate with other elements of a network, such as, for example, network nodes, and the device 214 may have one or more input and output ports. Processor 202 also can include an internal clock (not shown) to keep track of time, periodic time intervals, and the like.

A storage device 210 having a computer-readable medium is coupled to the processor 202 via a storage device controller 212 and the I/O bus 208 and the system bus 206. The storage device 210 is used by the processor 202 and controller 212 to store and read/write data 210a, as well as computer program instructions 210b used to implement the procedure(s) described below and shown in the accompanying drawing(s) herein, such as a network planning took. In operation, processor 202 loads the program instructions 210b from the storage device 210 into the memory 204. Processor 202 then executes the loaded program instructions 210b to perform any of the example procedure(s) described below, for operating the system 200.

An example work flow technique will now be described, with reference to FIG. 3. The technique (and each block described below), in one example, is performed by a network designer interacting with a network planning tool by way of a user-interface (e.g., interface 218) of a network planning tool device, such as display, mouse, keyboard, or the like. Information representing nodes and links of a network of interest can be displayed graphically on the interface 218, and, in one example, can be interacted with and/or manipulated by the network designer, in a known manner.

At block 300, network characteristic criteria can be specified (by way of, e.g., the user-interface 218) to define the structure and performance of the network of interest. For example, the criteria, which may be predetermined, can specify one or more of the number and type(s) of nodes and links to be used, locations where nodes and/or links should be placed in the network, the type(s) of fibers that should be employed, their lengths, dispersion factors, locations where traffic should be terminated, demands per link, an optical signal-to-noise ratio (OSNR), polarization mode dispersion, chromatic dispersion, attenuation, and any other types of criteria associated with the network, depending on applicable operating criteria. In one example embodiment, block 300 can be performed in accordance with the procedures described in the publication by R. Ramaswami, Chapter 8 ("WDM Network Design"), Optical Networks, $2^{nd}$ ed., 2002, pages 437-488 (hereinafter, the "Ramaswami publication"), although in other embodiments any other suitable techniques for specifying the criteria can be employed. That part of the Ramaswami publication is hereby incorporated by reference in its entirety, as if set forth fully herein. Also, in one example, the criteria can include one or more of the parameters associated with block number 300, as represented in FIG. 4B.

After criteria is specified at block 300, a determination can be made as to the types of equipment that should be included between terminations in the network, in order to meet the criteria. Thus, at block 310, so-called "commons", or common equipment can be specified for inclusion in the network design in order to place common network elements that will be needed to support existing and future traffic demands. As an example, commons can include equipment used by more than one communication path, such as network equipment (e.g., nodes, working and/or protect fibers, and the like) between terminations or source and destination nodes. Also in one example, block 310 can include specifying the inclusion of WDM and/or DWDM equipment (e.g., cards with WDM and/or DWDM capability). Typically, networks can grow over time, and more demands can be added using such cards, until network capacity (e.g., 1.75 Terabit) is fulfilled. The manner in which block 310 is performed can be in accordance with known or later developed techniques, including those described in the Ramaswami publication referred to above, although the techniques are not limited only thereto. Also, in one example the parameters represented in FIG. 4C in association with the block number 310 listed in the right-most column, are examples of information that can be specified in block 310 of FIG. 3.

Next, at block 320, demands can be specified to be added in the network design. This procedure can include specifying at least one of (a) one or more demand protection types, (b) working channel(s)/wavelength(s), (c) protection channel(s)/wavelength(s), (d) shared protection channel(s)/wavelength(s), and/or (e) the type(s) of demand(s) (i.e., traffic type) and their bandwidths (i.e., bit rate(s)), and the like. In one example embodiment, block 320 can be performed in accordance with known or later developed techniques, including those described in the publication by E. Bouillet et al., entitled "Path Routing in Mesh Optical Networks", Chapters 1 to 4, pages 1 to 105, John Wiley & Sons, 2007 488 (hereinafter, the "Bouillet et al. publication"), or in accordance with any other suitable techniques. That part of the Bouillet et al. publication is hereby incorporated by reference in its entirety, as if set forth fully herein. Also, in one example, the information specified can include one or more of the parameters associated with block number 320, as represented in FIG. 4B.

With respect to an example of demand protection types that may be specified at block 320, each type has a unique characteristic, as can be taken into account by the network designer. Protection paths generally are dedicated and can be switched-to very quickly, and fast enough to avoid dropping a phone call. More than a single protection type also can be provided for further protection. Restoration, as compared to protection, can be somewhat slower and non-guaranteed, can switch in seconds or minutes, and may have one or more restoration paths. Restoration can be useful for accommodating interne type traffic, for example. Another fault recovery type that may be specified is "full time" protection with restoration. When a fault occurs and is detected, for example, the affected working path is switched to the protect path, and a restoration path around the fault is effected by switching to a new protect path. As such, traffic substantially never goes unprotected in this recovery process. Of course, any other suitable recovery type also may be selected at block 320, and these examples are not intended to be limiting.

Restoration traffic paths can be chosen at a time when a fault occurs so that a path is selected from a variety of choices. Enabling each link in the network of interest can add to overall costs, and thus, in order to minimize costs, only a specific set of links can be enabled. The choice of these links reserved for restoration can be further minimized if some links can be shared by traffic between different destinations, with the assumption that use of these links by different traffic demands will not occur simultaneously. Associated risks can be quantified and a business decision can be made by a service provider, for example, as to the amount of sharing to be permitted.

At block 330 demands are routed in the network planning tool by the network designer using, for example, the user-interface 218. Because the demands have been already specified, they can now be routed at block 330. In one example embodiment, block 330 can be performed in accordance with the procedures described in Bouillet et al. publication, referred to above, and can use information such as the parameters represented in FIG. 4C in association with the block number 330 shown in the right-most column of that Figure.

A route can be determined between, for example, a source node and a destination node, where the destination node can be, e.g., either a drop node or a so-called "glass" node (i.e., a node that does not contain network equipment that enables the node to serve as a drop node; for example, a glass node may merely include a patch panel, or some other interface connecting two different transmission links or different types of transmission links). Information representing nodes and links of the network can be displayed graphically in this example (see, e.g., the graphical representation in the Figures), and the network operator can designate source and destination nodes, for example, by operating a user-interface to select them.

In a communication network having a plurality of inter-connected nodes, there may be multiple routes that data can traverse from a source node to a drop node (i.e., a node where the data will be used). There may be a direct link between the source node and the drop node, and/or there may be a plurality of routes from the source node to the drop node via one or more intermediate nodes. Particular routes between a source node and each drop node can be provisioned (i.e., established) so that network equipment know how to route data to a particular drop node. The information regarding provisioned routes can be stored in a routing table that a node uses to determine the appropriate route to send or forward data (the routing table can be stored in a computer program memory, for example), or the network can be engineered to ensure that data flows in a certain way (i.e., network equipment can be wired or cabled to constrain the flow of data in a specific direction).

Various techniques are known for automatically provisioning network routes to optimize transmission characteristics. For example, techniques are known that determine the shortest distance between nodes, the fewest number of links to be traversed between nodes, and the minimum cost route (where a weighted value or "cost" is assigned to each network link). The number of routes may be large due to the network type, e.g., a mesh network in which nodes may be linked to multiple other nodes, or due to the type of data traffic for which routes are being provisioned, e.g., broadcast traffic where routes must be provisioned from a source node to each of multiple drop nodes. Further, in the case of broadcast data, a secondary (i.e., backup) source node can be used, and routes can be provisioned from the secondary source node to each drop node, preferably using diverse routing (i.e., routes that differ from the routes used from the primary source node).

One approach to achieve diverse routing in a mesh network has been to divide the mesh network into plural ring networks. In a ring network, each node is linked to just two other nodes, so traffic received on one link is always sent out on the other link, and vice versa. Diverse routing is achieved within each ring by routing the unidirectional traffic in opposite directions along the ring. In a mesh network, some of the nodes might get the same traffic flow more than once.

Various algorithms are known for determining an optimal or near-optimal route based on various criteria. For example, known algorithms can determine a route based on the shortest number of spans or the least cost (taking into account distance, transmission speed, etc.). Information regarding characteristics of the nodes and links interconnecting various nodes is stored in memory, for example, and can be read and used in executing a routing algorithm. Any suitable type of exiting or later developed routing algorithm(s), and any suitable type of technique for enabling the operator to specify routes using the algorithm, can be employed at block 330, including, for example (and without limitation), those described in U.S. patent application Ser. No. 11/936,379, filed Nov. 7, 2007, and U.S. Pat. No. 7,346,709, issued Mar. 18, 2008, each of which is incorporated by reference herein in its entirety, as if set forth fully herein.

The performance of block 330 can include, by example, selecting nodes (i.e., source and destination nodes), and optionally, selecting one or more shelves at the nodes (if such equipment is already present). Block 330 also can include selecting path route criteria, designating at least one working path, designating at least one protection path, and designating at least one shared protection path, for the selected routes.

In one example, selecting of path routing criteria at block 330 can be performed based on the following criteria (and/or other parameters besides those below):

Maximum Number of Paths: 1 to n, wherein n is an integer greater than 1;

Path Diversity: no common links in each path, but can have common nodes;

Node Diversity: no common links and no common nodes in each path;

Max. Number of Hops for each Path: no limit, 1 to n.

Next (block 340), and referring again to FIG. 3, equipment is specified to be placed in accordance with the information specified in the above blocks. For example, the network operator may specify that particular types of cards and/or regeneration nodes and the like be provided at particular network locations. The procedure of block 340 may be performed using any suitable existing or later developed techniques, and, in one example, it can be determined based on customer (e.g., service provider) preferences. Example parameters that can be specified in block 340 are represented in FIG. 4A.

An example aspect herein will now be described. The inventors have recognized that, while planning using a network planning tool in the above manner can be useful, the overall process can be made even more efficient and require less network designer guidance and oversight relative to existing planning tools. Thus, in accordance with an example aspect herein, the inventors have discovered a network planning learning tool that automatically learns network attributes, such as user selections, specified criteria, trends, and other parameters, to achieve greater efficiency over existing network planning tools. By learning such attributes, the tool converts them from variables to constants, until they are changed again by re-learning or otherwise re-specified. As such, in a case where a customer, such as, e.g., a service provider, specifies certain attributes, the attributes can be earned by the tool over time or otherwise.

Figure 3:
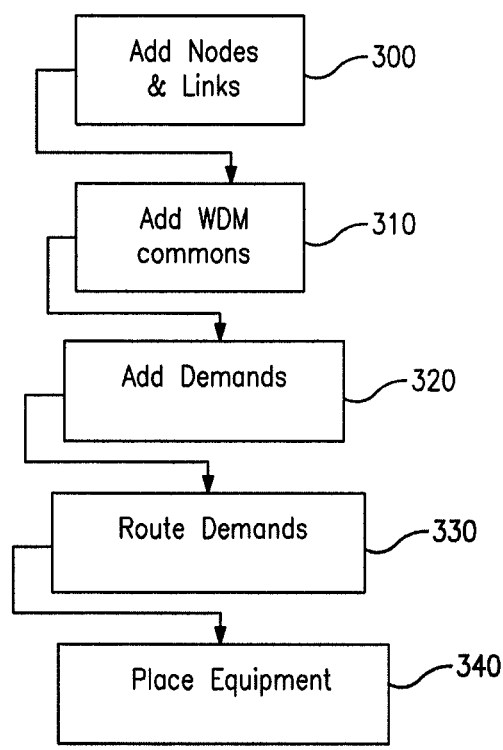
FIG. 3 is a flow diagram that illustrates a procedure in accordance with an example embodiment described herein.
Figure 4D:
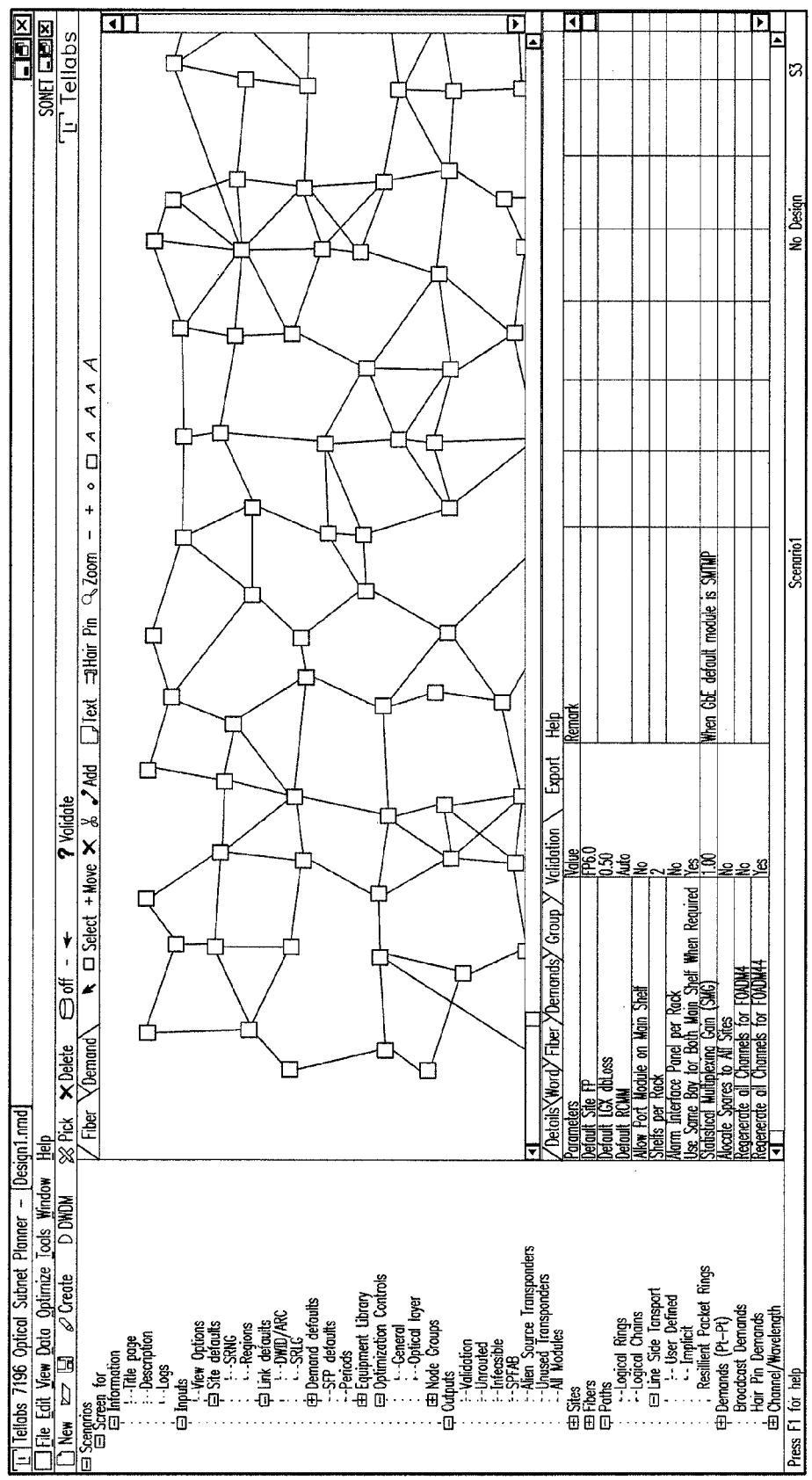
FIG. 4D is a graphical representation of screen display depicting a communication network and various menu items.
Figure 7:
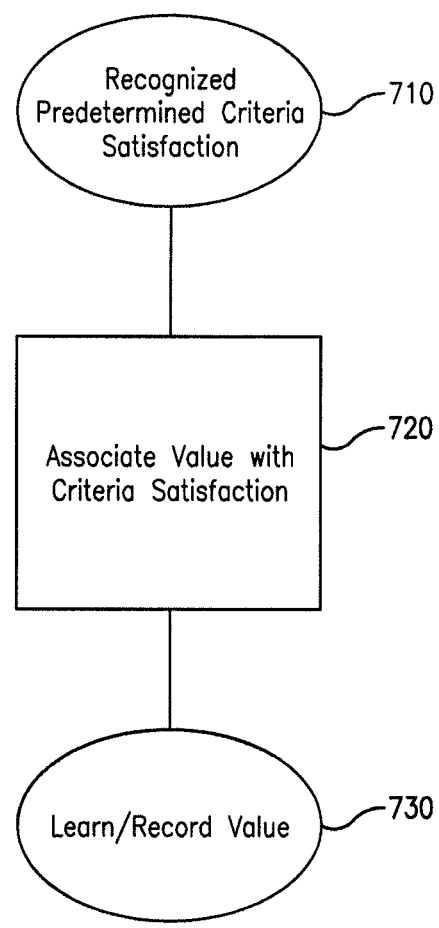
FIG. 7 is a flow diagram that illustrates a procedure in accordance with an example embodiment described herein, and which may be a sub-component of the procedure of FIG. 3.

As an example, learning can be performed based on information specified by the network designer in the procedure of FIG. 3. Many types of attributes can be set as defaults (by the designer, or automatically) in the network learning tool (see, e.g., FIG. 4D), and a predetermined learning algorithm can be used to save these items and set them to defaults if they meet one or more particular learning criteria (e.g., the setting of an example parameter "A" to "q" three times, causes it to become a default value). In another example, the attributes can be automatically specified as defaults, or can be set based on other learning criteria. Various types of network attributes can be converted to default values in this manner, including (without limitation) network element parameters, site parameters, link parameters, demand parameters, optical parameters, general parameters, and networking parameters, such as those represented in FIGS. 4A to 4C. For example, as represented in the flow diagram of FIG. 7, the network learning tool can learn one or more attributes (parameters) by recognizing the triggering/satisfaction of one or more predetermined learning criteria (block 710), such as, for example, the elapse of a predetermined amount of time from a triggering event (e.g., a user selection), or in response to a predetermined number of events or selections, or in response to recognizing that a particular node type (e.g., optical regeneration sites), fiber type and specification including fiber availability, and bandwidth allocation and routing, are most commonly or frequently selected, and thus store them as defaults to be used automatically in the network planning learning tool when planning the network of interest or future networks. Upon performance of the recognition at block 710, the tool correlates the value(s) associated with the recognition (e.g., the value(s) of the applicable parameter present upon the satisfaction of the learning criteria) (block 720), and records the value(s) as default value(s) for the parameter(s) (block 730). In this manner, the tool learns the applicable parameter(s). Thereafter, with the value(s) set, the network planning tool then takes the value(s) into account in subsequent iterations of the network planning procedure, until the value(s) are re-specified by the operator or changed again based on the predetermined criteria As pointed out above, in one example embodiment, the tool can learn one or more of the parameters shown in the tables represented in FIGS. 4A, 4B, and 4C in the above manner. As shown in that table, parameters are represented in correspondence with associated parameter values, remarks, and block numbers in adjacent columns (and these parameter values can be set at block 340 above, and/or in the respective blocks of FIG. 3 identified by those block numbers in the right-most column associated with the respective parameter values). The remarks set forth in association with a particular parameter define that parameter, as one skilled in the art would appreciate in view hereof. In one example embodiment, there are various categories of parameters, as represented in FIGS. 4A to 4C, including, by example only, network elements parameters (FIG. 4A), site parameters (sometimes also referred to as "node parameters" or "building parameters"), link parameters, demand parameters (FIG. 4B), optical parameters general parameters, and networking parameters (FIG. 4C).

As but one example, in a case where a parameter used in the procedure defines the maximum number of add/drop channels to be used in a network node the procedure herein can learn and then set a value for that parameter (e.g., '4') (blocks 720 and 730), based triggering/satisfaction of on one or more of the criteria above (block 710). Thereafter, with that value set, the network planning tool then takes that value into account in subsequent iterations of the network planning procedure, until the value is re-specified by the operator or changed again based on the satisfaction/triggering of the learning criteria. In a similar manner, predetermined threshold values can be learned, such as those which, when exceeded, result in certain warning or alarm messages being generated (e.g., SPFAB SONET/SDH Capacity Warning Message threshold, SPFAB SONET/SDH Capacity Error Message Threshold, etc.) in a network of interest. Example values of those thresholds are represented in FIG. 4A. Similarly, in an example case where parameters used in the procedure define the maximum number of sites per ring in the network of interest, the maximum number of add/drop sites per ring, and a maximum ring circumference (e.g., in kms), then the procedure described herein can learn and set values (blocks 720 and 730) for those parameters, respectively (e.g., '64', '64', '0=no limit'), based on triggering/satisfaction of one or more of the learning criteria above (block 710). In an example case where parameters used in the procedure define whether to permit add-drop at user or proposed optical line amplifier (OLA) sites, then the procedure described herein can learn and set values for those parameters, respectively (e.g., 'Yes' or 'No'), based on triggering/satisfaction of one or more of the learning criteria above.

In an example case where respective parameters used in the procedure define a maximum light path distance (e.g., in kms), whether to compute OSNR, and whether to concatenate rings when needed, then the procedure described herein can learn and set values for those parameters (blocks 720 and 730), respectively (e.g., '1150000', 'Yes', Yes'), based on triggering/satisfaction of one or more of the learning criteria above (block 710). In an example case where parameters used in the procedure define default error correction procedure types to use in the network of interest, and default regeneration modules to be employed in the network for certain applications, such as 10G, 2.5G, 40G, and 40G-RZ applications, then the procedure described herein can learn and set values for those parameters (blocks 720 and 730), respectively (e.g., "EFEC", "TGTM-E[82]", "MRTM-E[82]", "FGTM-M-DPSK", and "FGTM-M-DQPS". Respectively), based on triggering/satisfaction of one or more of the learning criteria above (blocks 710).

After any of the values mentioned above are set in this manner, the network planning tool then takes them into account in subsequent iterations of the network planning procedure, until the values are re-specified by the operator or changed again based on satisfaction/triggering of the predetermined learning criteria. In a similar manner, parameters defining the maximum number of channels (e.g., 88) to be supported by the network of interest, and the maximum percentage of channels (e.g., 100%) to use, also can be learned based on triggering/satisfaction of one or more of the learning criteria.

Figure 5:
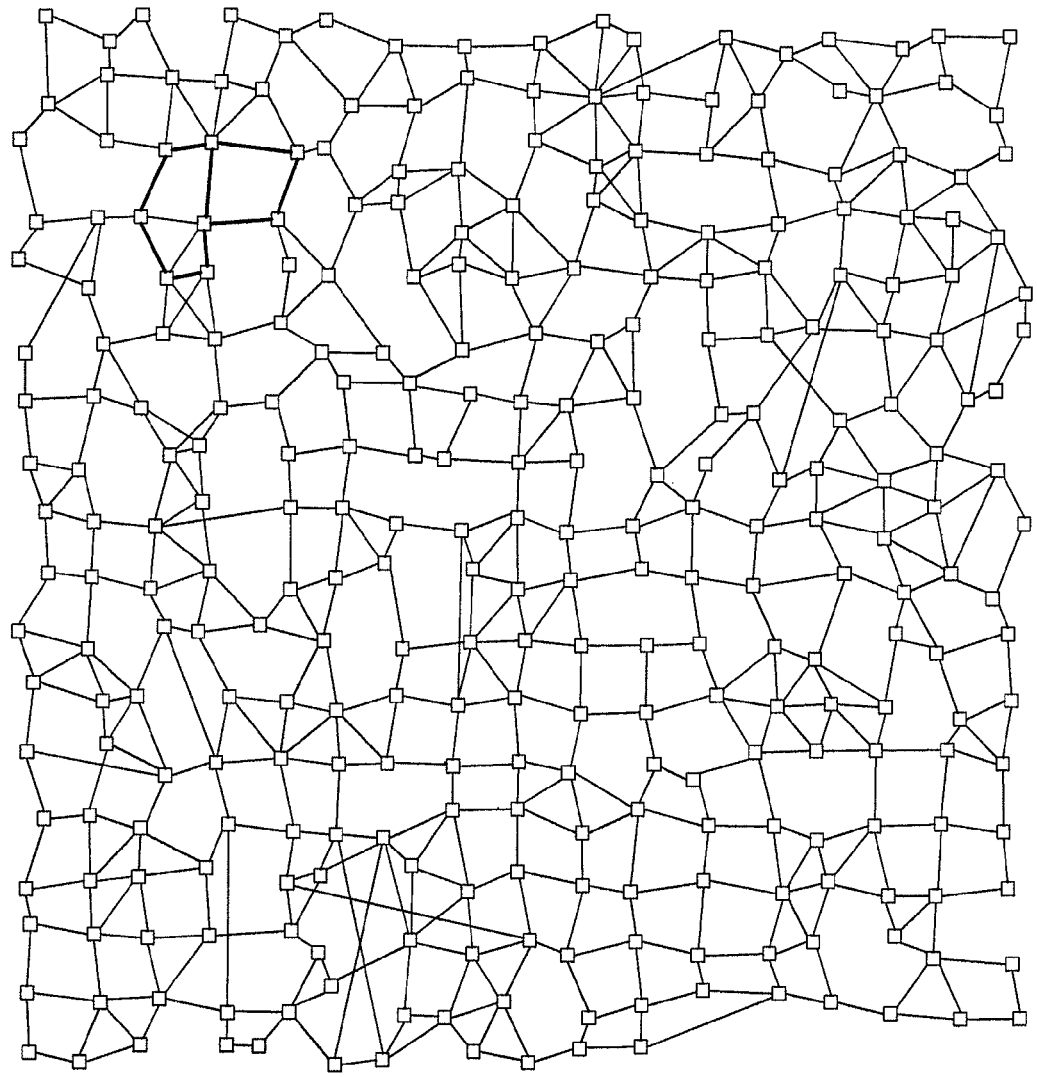
FIG. 5 is an example graphical representation of a mesh communication network that includes at least one ring configuration therein.
Figure 6:
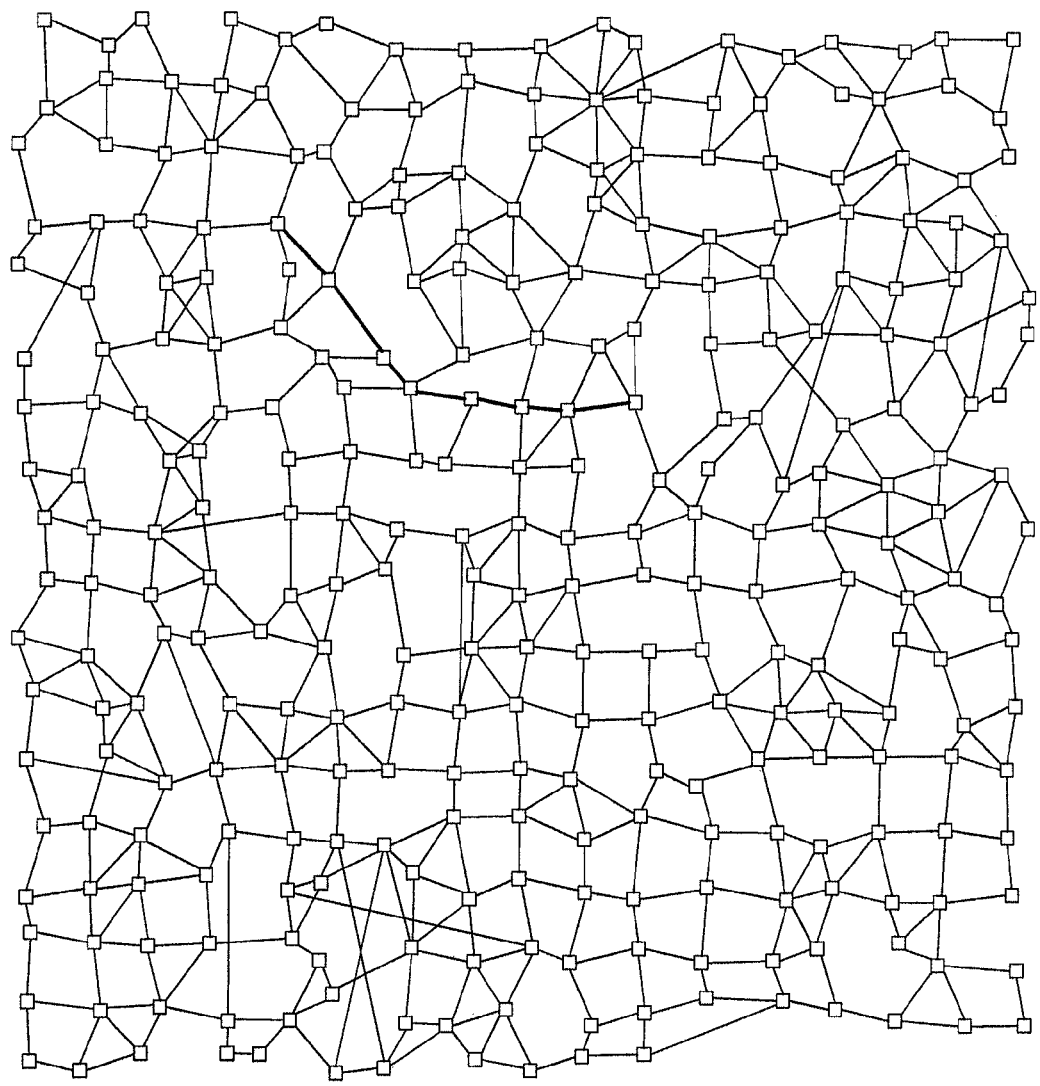
FIG. 6 is an example graphical representation of a mesh communication network.

Other network attributes for use in network planning can be learned as well, such as, e.g., routing tendencies. As an example, the network learning tool can learn which wavelength(s) and/or route(s) are selected for traffic between given sites (such as Site1 and Site14), specified in blocks 320 and 330, and routes future traffic demands on the same wavelength(s) and/or route(s). (An example ring network is represented in FIG. 5, and an example mesh network is represented in FIG. 6 (see the highlighted portion of each representation). In an example, the tool can learn the wavelength(s) and/or route(s) by recording the latest one(s) selected (blocks 720 and 730) in response to the triggering/satisfaction of one or more predetermined learning criteria, such as, for example, the elapse of a predetermined amount of time from a triggering event, or in response to a predetermined number of events or selections (block 710).

As an additional example, optical signals that have traveled for long distances can become degraded or corrupted by noise, losses, and other factors, and can require one or more regenerations. Thus, a network designer may specify a maximum distance before one or more regenerations should be employed, and also may designate certain nodes and/or routes in the network as being used for providing regeneration(s) (in block 320 above, for example). According to an example aspect, the tool memorizes and learns the designations (e.g., this can be done in response to triggering/satisfaction of learning criteria, such as that described above), so that in future implementations of the tool, the same maximum distance, nodes, and/or routes are employed by default, until new ones are learned or otherwise specified. In another example, the tool employs a record of where regeneration sites are situated in the network of interest, and automatically learns (block 730) to specify that traffic be routed in paths that include those sites in situations where the traffic is expected to travel more than a predetermined distance. Such route(s) can be learned at block 730 in response to predetermined criteria being triggered/satisfied as described above (blocks 710 and 720).

Also by example, traffic from sites that may be sub-rate (i.e., does not fill up an entire wavelength), may be groomed at intermediate sites, as known in the art. In one example aspect herein, the tool learns to groom traffic from a particular site at hub location(s) equipped with appropriate grooming devices to route future demands. Thus, a network designer may designate certain sites in the network as being used for providing grooming (in block 320 above, for example). According to this example aspect, the tool memorizes and learns the designation (blocks 720 and 730) (e.g., this can be done in response to learning criteria such as that described above being satisfied (block 710)), so that in future implementations of the tool, the same site(s) are employed by default grooming sites, until changed again by further learning or otherwise.

In a further example aspect, traffic of a particular protocol type, such as internet traffic, traditional voice traffic, SAN or Storage Area Network etc., can connect to appropriate devices connected to a network element. The tool learns these port locations (block 730). As an example, this can be done in response to the tool recognizing the triggering/satisfaction of predetermined learning criteria (blocks 710 and 720) as described above, such as, by example only, by recognizing that traffic of a particular protocol has been specified a predetermined number of times (or within a specified time period) as being designated to connect to one or more specific port location(s), or upon the occurrence of one or more predetermine events.

In still a further example aspect, traffic routes of a particular protection type, such as, e.g., fast dedicated protection, (slow) restoration protection, multiple path protection (one path protected by more than one disjoint path), and/or other varied protection types, can be learned by the tool to route future demands. For example, in response to recognizing that one or more particular routes have been designated a predetermined number of times for use as a particular protection type (or in response to other learning criteria being satisfied) (blocks 710 and 720), then the tool records (block 730) that those routes are to be employed for those respective protection types in routing future demands, in future uses of the tool.

In a similar manner, hierarchical schemes, such as using express routing (e.g., long distance carriers) can be learned by the tool to route future demands. By example, in response to recognizing that one or more particular routes have been designated a predetermined number of times for use with a particular hierarchical scheme (or in response to other learning criteria being triggered/satisfied) (blocks 710 and 720), then the tool records (block 730) that those routes are to be employed using such a scheme in routing future demands, in future uses of the tool.

Any other routing scheme where, for example, a user can specify which attributes of routing are to be profiled, also can be learned as well, not only those described above. Also, parameters of the categories of network element parameters, site parameters, link parameters, demand parameters, optical parameters, general parameters, and networking parameters, represented in FIGS. 4A, 4B, and 4C, are not intended to be exhaustive, but are illustrative in nature. The network planning learning tool described herein can learn any of those parameters, or any other designated parameters of interest.

As described above, a network planning learning tool according to an example aspect herein automatically learns network attributes, such as user selections, specified criteria, trends, and other parameters, to achieve greater efficiency over existing network planning tools. By virtue thereof, the overall network planning process is more efficient and requires less network designer guidance and oversight as compared to existing network planning tools. This is especially useful for planning mesh networks because it assists in minimizing equipment while maximizing protection for network architectures that are significantly more complex than corresponding ring architectures. It also is useful because in existing network tools, the setting of parameters generally requires constant operator input (e.g., particularly as to where to locate regeneration sites), because existing network tools lack the capability and algorithms to learn them, unlike in the example embodiments herein.

Figure 8A:
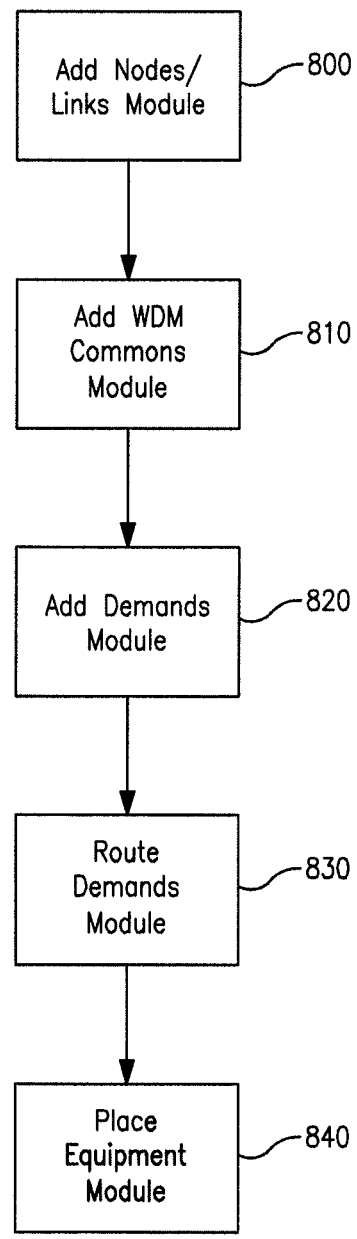
FIGS. 8A and 8B are logical diagrams of a circuit device in accordance with an example embodiment herein.
Figure 8B:
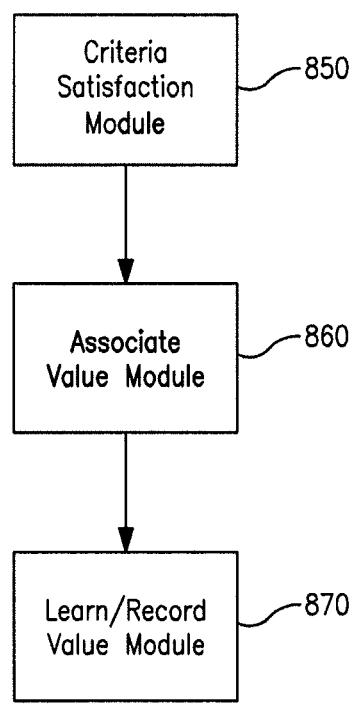

FIG. 8A illustrates a logical diagram of modules of an example system or similarly organized circuit device(s) (e.g., ASIC, PGA, FPGA, and the like) which could be used to form at least part of one or more actual network nodes represented in FIG. 1 and/or system 200 of FIG. 2, in accordance with example embodiments. The modules may include hardware circuitry, software, and/or combinations thereof. In an example embodiment, software routines for performing the modules depicted in logical diagram can be stored as instructions 210b in a storage device 210 and executed by processor 202 of one or more data processing systems 200 (FIG. 2). Logical diagram includes a module 800 that can perform the procedures of block 300 of FIG. 3, a module 810 that can perform the procedures of block 310 of FIG. 3, a module 820 that can perform the procedures of block 320 of FIG. 3, a module 830 that can perform the procedures of block 330 of FIG. 3, and a module 840 that can perform the procedures of block 340 of FIG. 3. FIG. 8B includes a module 850 that can perform the procedures of block 710 of FIG. 7, a module 860 that can perform the procedures of block 720 of FIG. 7, and a module 870 that can perform the procedures of block 730 of FIG. 7. In other example embodiments of the invention, the number of modules employed can differ from that depicted in FIGS. 8A and 8A, and one or more individual ones of the modules in FIGS. 8A and 8B can perform more than one of the procedures referred to above, such that any number and combination of modules can be provided.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "machine readable medium", or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the present invention, are presented for example purposes only. The architecture of example aspect of the present invention is sufficiently flexible and configurable, such that it may be utilized (and navigated) in ways other than that shown in the accompanying figures.

In addition, it is not necessary that the procedures herein be done with a graphical user interface, and the designer selections and commands can be made in some other interactive way. Further, the selections and the like described herein need not be performed by and/or used by a human user. Instead, they can be performed automatically, by a data processing apparatus programmed or otherwise instructed to conduct the procedures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed is:

1. A method for operating a network planning tool, comprising:
   recognizing the occurrence of individual ones of a plurality of predetermined events, on an event-by-event basis;
   correlating the individual ones of the predetermined events recognized as having occurred with respective, corresponding ones of a plurality of current network attribute values, each current network attribute value being correlated to in the correlating in response to a corresponding one of the predetermined events being recognized as having occurred in the recognizing;
   selectively learning individual ones of the current network attribute values as they are correlated to in the correlating, wherein for each current network attribute value correlated to, the learning includes converting only that current network attribute value, and not all of the network attribute values, from a variable into a constant default value and storing that constant default value; and
   performing network planning operations employing learned ones of the current network attribute values until there is further recognizing of the occurrence of individual ones of the predetermined events.

2. The method as set forth in claim 1, wherein the plurality of predetermined events includes at least one of an elapse of a predetermined amount of time, an occurrence of a predetermined number of event conditions, a network attribute value being specified a predetermined number of times, and a recognition that a network attribute value has a greatest frequency among network attribute values.

3. The method as set forth in claim 1, wherein at least one of the network attribute values specifies a maximum number of add/drop channels to be used in at least one network node of the network.

4. The method as set forth in claim 1, wherein at least one of the network attribute values specifies at least one alarm threshold.

5. The method as set forth in claim 1, wherein at least one of the network attribute values specifies at least one of a maximum number of sites per network ring, a maximum number of add/drop sites per ring, and a maximum ring circumference.

6. The method as set forth in claim 1, wherein at least one of the network attribute values specifies a maximum light path distance.

7. The method as set forth in claim 1, wherein at least one of the network attribute values specifies a routing path.

8. The method as set forth in claim 1, wherein at least one of the network attribute values specifies at least one grooming node of a network.

9. The method as set forth in claim 1, wherein at least one of the network attribute values specifies a traffic protection type for a communication type.

10. The method as set forth in claim 1, wherein at least one of the network attribute values specifies a regeneration site.

11. The method as set forth in claim 1, wherein the network attribute values specify a network element parameter, a site parameter, a link parameter, a demand parameter, an optical parameter, a general parameter, and a networking parameter, respectively.

12. A network planning tool, comprising:
    a user-interface;
    a memory, storing a computer program; and
    a processor, coupled to the user-interface and the memory, and operating under control of the computer program to (a) receive network attribute values inputted by way of the user-interface, (b) recognize the occurrence of individual ones of a plurality of predetermined events, on an event-by-event basis, (c) correlate the individual ones of the predetermined events recognized as having occurred with respective, corresponding ones of a plurality of current network attribute values, each current network attribute value being correlated to in response to a corresponding one of the predetermined events being recognized as having occurred, (d) selectively learn individual ones of the current network attribute values as they are correlated to, wherein for each current network attribute value correlated to, learning includes converting only that current network attribute value, and not all of the network attribute values, from a variable into a constant default value and storing that constant default value in the memory, and (d) perform network planning operations employing learned ones of the current network attribute values until a further recognizing of the occurrence of individual ones of the predetermined events.

13. The network planning tool as set forth in claim 12, wherein the network attribute values specify a network element parameter, a site parameter, a link parameter, a demand parameter, an optical parameter, a general parameter, and a networking parameter, respectively.

14. The network planning tool as set forth in claim 12, wherein the plurality of predetermined events includes at least one of an elapse of a predetermined amount of time, an occurrence of a predetermined number of event conditions, a network attribute value being inputted a predetermined number of times, and a recognition that a network attribute value has a greatest frequency among network attribute values.

15. The network planning tool as set forth in claim 12, wherein at least one of the network attribute values specifies a traffic protection type for a communication type.

16. The network planning tool as set forth in claim 12, wherein at least one of the network attribute values specifies a regeneration site.

17. The network planning tool as set forth in claim 12, wherein at least one of the network attribute values specifies a maximum number of add/drop channels to be used in at least one network node of the network.

18. The network planning tool as set forth in claim 12, wherein at least one of the network attribute values specifies at least one of a maximum number of sites per network ring, a maximum number of add/drop sites per ring, and a maximum ring circumference.

19. A non-transitory computer readable medium having stored thereon sequences of instructions, the sequences of instructions including instructions which, when executed by a computer system, cause the computer system to perform a method for operating a network planning tool comprising:

recognizing the occurrence of individual ones of a plurality of predetermined events, on an event-by-event basis;

correlating the individual ones of the predetermined events recognized as having occurred with respective, corresponding ones of a plurality of current network attribute values, each current network attribute value being correlated to in the correlating in response to a corresponding one of the predetermined events being recognized as having occurred in the recognizing;

selectively learning individual ones of the current network attribute values as they are correlated to in the correlating, wherein for each current network attribute value correlated to, the learning includes converting only that current network attribute value, and not all of the network attribute values, from a variable into a constant default value and storing that constant default value; and performing network planning operations employing learned ones of the current network attribute values until there is further recognizing of the occurrence of individual ones of the predetermined events.

20. The method of claim 1, wherein the occurrence of each predetermined event is based on a user selection of the corresponding network attribute value.

* * * * *